(12) United States Patent
Atluri et al.

(10) Patent No.: US 10,169,099 B2
(45) Date of Patent: Jan. 1, 2019

(54) REDUCING REDUNDANT VALIDATIONS FOR LIVE OPERATING SYSTEM MIGRATION

(71) Applicant: International Business Machines Corporation, Armonk, NY (US)

(72) Inventors: Uma S. Atluri, Round Rock, TX (US); Brian W. Hart, Austin, TX (US); Anil Kalavakolanu, Austin, TX (US); Minh Q. Pham, Austin, TX (US); Teresa H. Pham, Cedar Park, TX (US); Evelyn T. Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 14/860,765

(22) Filed: Sep. 22, 2015

(65) Prior Publication Data
US 2017/0024235 A1   Jan. 26, 2017

Related U.S. Application Data

(63) Continuation of application No. 14/808,645, filed on Jul. 24, 2015.

(51) Int. Cl.
G06F 9/50        (2006.01)
G06F 9/455       (2018.01)

(52) U.S. Cl.
CPC ........ G06F 9/5077 (2013.01); G06F 9/45558 (2013.01); G06F 9/5088 (2013.01); G06F 2009/4557 (2013.01); G06F 2009/45583 (2013.01)

(58) Field of Classification Search
None
See application file for complete search history.

(56) References Cited

U.S. PATENT DOCUMENTS

| 8,533,164 B2 | 9/2013 | Pafumi et al. |
| 8,826,033 B1* | 9/2014 | Krishnaprasad ........ G06F 21/53 713/187 |
| 2009/0177878 A1* | 7/2009 | Gao .................... H04L 67/1097 713/100 |
| 2011/0197097 A1* | 8/2011 | Beaty ..................... H04L 41/16 714/27 |
| 2011/0225582 A1* | 9/2011 | Iikura ................. G06F 11/1415 718/1 |

(Continued)

OTHER PUBLICATIONS

IBM: List of IBM Patents or Patent Applications Treated Related (Appendix P), Sep. 22, 2015, 2 pages.

(Continued)

*Primary Examiner* — Wynuel S Aquino
(74) *Attorney, Agent, or Firm* — Dmitry Paskalov (57) ABSTRACT

A method, system, and program product is provided for reducing redundant validations for live operating system migration. A control point caches at least one validation inventory that is associated with a logical partition (LPAR). The control point sends the cached validation inventory to a virtualization manager upon an activation of the LPAR associated with the validation inventory. The control point invalidates the cached validation inventory upon notification from the virtualization manager that the validation inventory is changed and is no longer valid. The control point re-validates the validation inventory.

6 Claims, 4 Drawing Sheets

(56) References Cited

U.S. PATENT DOCUMENTS

| | | | |
|---|---|---|---|
| 2012/0137285 A1 | 5/2012 | Glikson et al. | |
| 2012/0159634 A1* | 6/2012 | Haikney | G06F 21/53 726/25 |
| 2013/0238930 A1 | 9/2013 | Umbehocker | |
| 2014/0068022 A1* | 3/2014 | Kshirsagar | H04L 41/0806 709/220 |
| 2014/0129958 A1 | 5/2014 | Garza et al. | |
| 2014/0201732 A1* | 7/2014 | Haag | G06F 9/45533 718/1 |
| 2015/0339476 A1* | 11/2015 | Davis | G06F 21/552 726/22 |

OTHER PUBLICATIONS

Atluri et al., "Reducing Redundant Validations for Live Operating System Migration," U.S. Appl. No. 14/808,645, filed Jul. 24, 2015, 24 pages.

\* cited by examiner

REDUCING REDUNDANT VALIDATIONS FOR LIVE OPERATING SYSTEM MIGRATION

BACKGROUND

This disclosure relates generally to computer system resource virtualization, and more particularly to reducing redundant validations for live operating system migration.

A physical computer can host multiple virtual machine instances, each also referred to as a logical partition (LPAR) or client. Each virtual machine shares the hardware resources of the physical computer, and emulates a physical computer. A virtualization manager, also referred to as a virtual I/O server (VIOS), manages the virtualization of the physical hardware resources. Each virtual machine is under the control of an operating system. In the virtualized environment, the operations of the physical computer and the virtual machines are managed by a control point, also referred to as a hardware management console (HMC). In one exemplary operation, under the coordination of the control point and virtualization manager, the executing workloads of one or more of the virtual machines can be migrated from one physical computer to another without disruption. This migration is referred to as a mobility event, live partition mobility, or live operating system migration. In a typical mobility event configuration, the source and target physical computers share a connection to a storage area network (SAN) since the source and target physical computers can be geographically separated. The migrating virtual machine also has a virtual connection to the SAN through the source physical computer. The mobility event is preceded by a pre-migration validation, in which the control point establishes an inventory of physical resources used by the virtual machine on the source machine and verifies that sufficient compatible physical resources, particularly the shared SAN connection, are available on the target physical computer.

Migrating virtual machines can increase application availability, since the executing workload can be non-disruptively migrated to facilitate data center operations, such as hardware maintenance and software upgrades. However, the pre-migration validation checks can consume a significant portion of the overall migration, since some configurations may include an extensive inventory of devices. Therefore, safely eliminating redundant pre-migration validation checks can increase the performance of mobility events.

SUMMARY

According to one embodiment, a method is provided for reducing redundant validations for live operating system migration. The method provides caching, by a control point, at least one validation inventory whereby the at least one validation inventory is associated with a logical partition (LPAR). The method provides sending, by the control point, the at least one cached validation inventory to a virtualization manager in response to an activation of the associated LPAR. The control point invalidates the cached validation inventory upon receiving notification from the virtualization manager.

In another embodiment, a computer program product for reducing redundant validations for live operating system migration is provided. The computer program product provides a computer readable storage medium readable by a processing circuit and storing instructions for execution by the processing circuit for performing a method. The method provides caching, by a control point, at least one validation inventory whereby the at least one validation inventory is associated with a logical partition (LPAR). The method provides sending, by the control point, the at least one cached validation inventory to a virtualization manager in response to an activation of the associated LPAR. The control point invalidates the cached validation inventory upon receiving notification from the virtualization manager.

According to another embodiment, a computer system for reducing redundant validations for live operating system migration is provided. The computer system includes a memory, a processing unit communicatively coupled to the memory, and a management module communicatively coupled to the memory and processing unit, whereby the management module is configured to perform the steps of a method. The method provides caching, by a control point, at least one validation inventory whereby the at least one validation inventory is associated with a logical partition (LPAR). The method provides sending, by the control point, the at least one cached validation inventory to a virtualization manager in response to an activation of the associated LPAR. The control point invalidates the cached validation inventory upon receiving notification from the virtualization manager.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
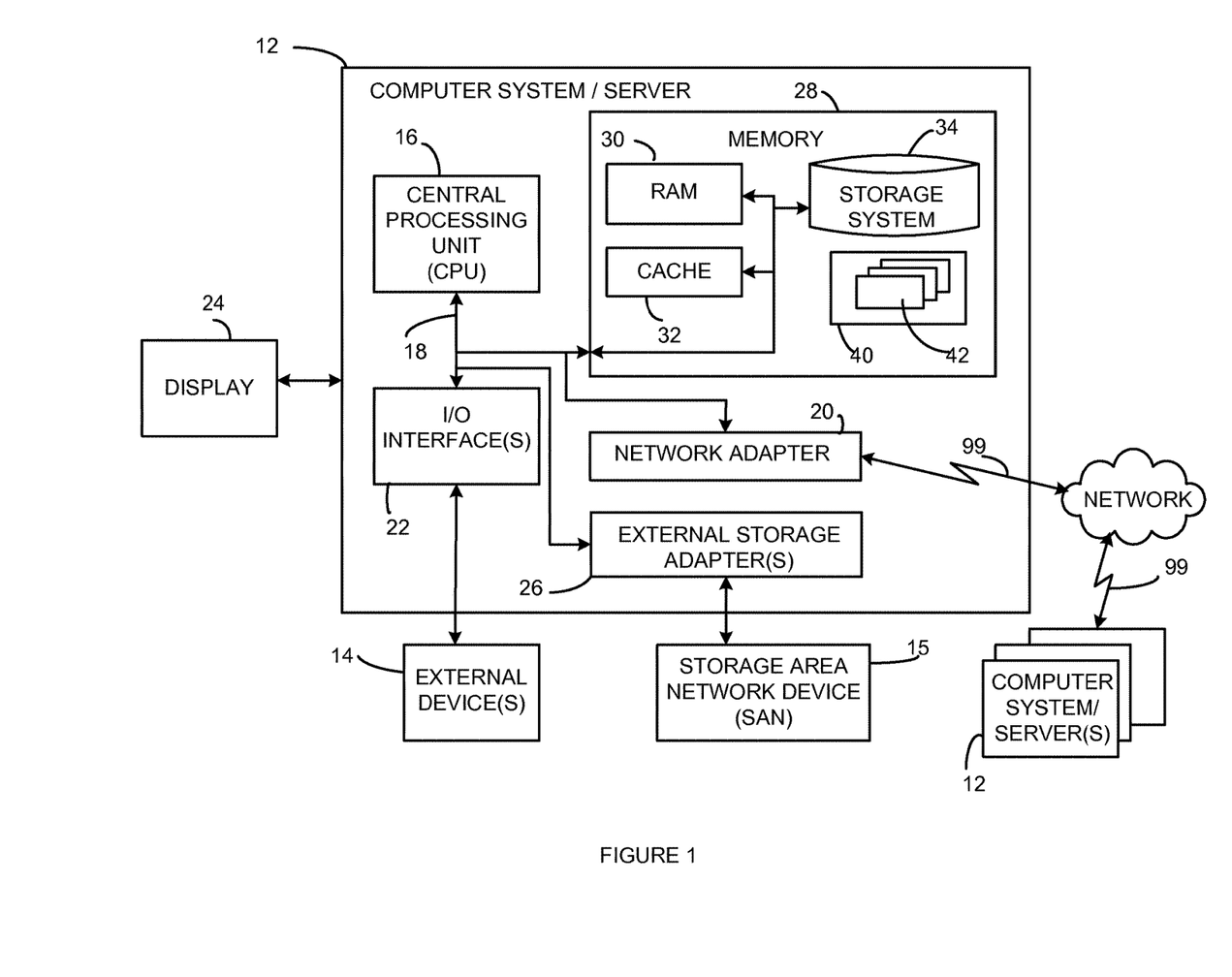
FIG. 1 illustrates an exemplary computing node operable for various embodiments of the disclosure.

FIG. 1 illustrates a block diagram of an exemplary computer system (i.e., server) 12 operable for various embodiments of the disclosure. As shown, the server 12 is only one example of a suitable computer for migrating a logical partition (LPAR) from one machine to another and is not intended to suggest any limitation as to the scope of use or functionality of embodiments of the disclosure described herein.

The server 12 is operational in numerous other computing system environments or configurations. For example, the server 12 may be a virtual partition on physical host, a clustered server environment, or a distributed cloud computing environment that include any of the above systems, and the like. When practiced in a distributed cloud computing environment, tasks may be performed by both local and remote servers 12 that are linked together and communicate through a communications network, such as the network 99. In an embodiment of the present invention, the local and remote servers 12 may be referred to as the source and target servers for live operating system migrations. Additionally, an embodiment of the server 12 includes a standalone machine control point, also referred to as a hardware management console (HMC), acting as the coordinator for the inventory validation and live operating system migrations. In another embodiment, the server 12 may include a systems management appliance configured to provide a single focal point for systems management, including hardware configuration, and software, hardware, and network management in a multi-node or multi-server environment. Another embodiment of the server 12 includes the virtual I/O server (VIOS), also referred to as a virtualization manager, which hosts the virtual machines, also referred to as logical partitions (LPAR) or clients, manages the virtualization of the physical hardware resources, and participates in the live operating system migration.

The server 12 may be described in the context of executable instructions, such as a program, or more specifically, an operating system (OS) 40 that is an aggregate of program modules 42, components, objects, logic, or data structures, for example, being executed by the processing unit 16 to control the operation of the server 12. Inventory validation and live operating system migration may be implemented as program modules 42 or as extensions to the OS 40. At least a portion of the OS 40 may be specialized to execute the algorithm of FIGS. 3-4.

Each participating server 12 is under the control of an OS 40 residing on each local and remote server 12, respectively. Each instance of the virtual machine is an emulation of a physical computer. A physical computer may host multiple virtual machine instances, each sharing the hardware resources of the physical computer, and each emulating a physical computer. Each of the virtual machine instances is under the control of an OS 40.

As shown in FIG. 1, the components of the server 12 may include, but are not limited to, one or more processors or processing units 16, a system memory 28, and a bus 18 that couples various system components, such as the system memory 28, to the processing unit 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22.

The server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18. However, in a multi-tenant datacenter (MTD) environment, such as a cloud computing environment, network communications may be routed through the member servers 12 and virtual machines through both physical devices (e.g., network adapters network switches), and virtualized networks, such as those implemented using software defined networking (SDN).

External storage adapter 26 connects the server 12 with external storage subsystems, such as a storage area network (SAN) 15. For a live operating system migration, also referred to as a mobility event or live partition mobility, the source and target servers share a connection to the SAN 15. The migrating virtual machine also has a virtual connection to the SAN 15 through the source physical computer. Exemplary external storage adapters 26 include, but are not limited to, a host bus adapter (HBA) also referred to a Fibre Channel, host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to: microcode, device drivers, redundant processing units, external disk drive arrays, tape drives, and data archival storage systems, etc.

Figure 2:
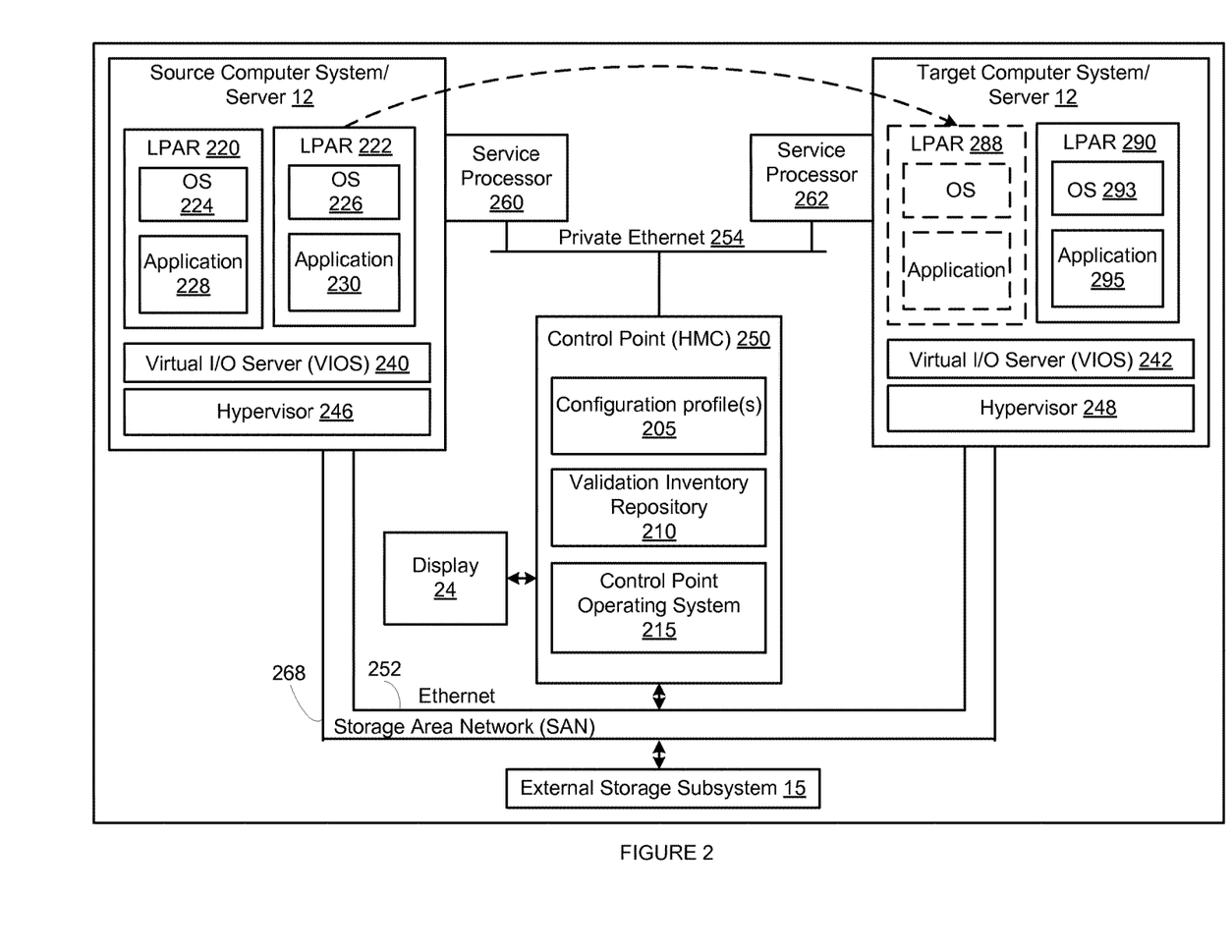
FIG. 2 is a diagram illustrating an embodiment of a data processing system for reducing redundant validations for operating system migrations.

FIG. 2 illustrates a system for reducing redundant validations for live operating system migration. The embodiment includes source and a target server systems 12. Source server system 12 includes LPARs 220 and 222, although a greater or fewer number of LPARs may be provisioned. LPARs are assigned a subset of a computer's physical hardware resources (i.e., a subset of the hardware underlying the server environment) and are virtualized within the server environment as a separate computer/virtual machine. Resources such as processor capacity, virtual and physical I/O devices, memory, or any other type of resource may be assigned to a particular LPAR. Each LPAR has its own operating system instance (e.g., OS 224, 226 and 293), application programs (e.g., application(s) 228, 230, and 295) and/or associated files, allowing for multiple virtual environments to be simultaneously executing within the server environment.

Specialized LPARs 240 and 242 are dedicated to implementing I/O functionality by executing VIOS software/firmware (software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system)). Logical partitioning, including the virtualization of the physical hardware resources, is facilitated by software/firmware hypervisor 246 and 248. The hypervisor 246/248 coordinates with the VIOS 240/242 and the control point 250 to control and monitor the state and operations of the server system 12 hardware and software, including the operating systems of the LPARs. The hypervisor 246/248 may run directly on the computer system's hardware, may be combined with the VIOS, or may run within a conventional operating system environment, depending upon the implementation The control point 250 performs system server and LPAR management in cooperation with the VIOS 240/242 and the hypervisor 246/248. The control point 250, or portions thereof, may be implemented in any suitable manner using known techniques that may be hardware-based, software-based, or some combination of both. For example, the control point 250 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In an alternate embodiment, the portions of the control point operation system 215 that manage LPAR profiles, perform LPAR operations (i.e., activate, de-activate, update), and perform inventory validation may be incorporated into the VIOS 240/242 operating system. Inventory validation, configuration profile management, and LPAR migration operations may be performed from the VIOS 240/242 and/or the control point 250. For example, in some embodiments, the display 24 of the control point 250 may be used to display, for selection by the user/administrator, various configuration profile 205 and validation inventory 210 data that may be available for selection for a mobility event. The selected information may be communicated from the control point 250 to VIOS LPAR 240 and/or 242.

The control point 250 includes a repository of configuration profiles 205. Each LPAR is associated with at least one profile that defines, among other parameters, the portion of the system server 12 hardware resources allocated to the LPAR, an indication of priority for receiving excess system resources, and an operating system environment. The configuration profile 205 includes the LPAR's virtual and physical I/O device configuration. The control point 250 includes a validation inventory repository 210. Each LPAR is associated with a validation inventory in the validation inventory repository 210. The LPAR's validation inventory may include a unique LPAR identifier, the mobility event source and target server systems, the LPAR's resources according to the LPAR's configuration profile 205, and an indication of whether the pre-migration validation passed or failed for the previous mobility event attempt. The validation inventory repository 210 may be cached on the control point 250. As part of the process of activating an LPAR the control point 250 locates, in the validation inventory repository 210, the validation inventory from the LPAR's previous validation and sends it to the VIOS 240/242 on the server system where the LPAR is defined. The VIOS 240/242 monitors the LPAR for configuration changes that may result in the validation inventory being invalidated, thereby requiring a full validation prior to a subsequent mobility event. The control point 250 may take one or more actions to respond to a notification of invalidity of the LPAR's validation inventory from the VIOS 240/242. For example, the control point 250 may note that a full validation is required for the LPAR upon the next mobility event. In another embodiment, the control point 250 may upon receiving the notification, initiate a full validation and cache the results in advance of the next mobility event. In a further embodiment, the control point 250 may initiate a partial validation for the newly modified, added or removed resource. As shown, the same control point 250 manages both the source and target server systems 12. However, different control points 250 can manage the source and target server systems 12, for example, when the source and target server systems 12 are geographically separated.

In the embodiment illustrated in FIG. 2, LPAR 222 is migrating from source server system 12 to target server system 12. LPAR 288 does not exist on the target server system 12, but will be dynamically created as part of the migration. While migration can be performed while an LPAR is not active, the various embodiments herein particularly apply to migrating executing workloads. LPARs can be migrated between different hardware platforms, and multiple LPARs may be migrated serially or concurrently. The transfer or migration of LPAR 222 from source server system 12 to target server system 12 is coordinated by the control point 250, with the cooperation of the hypervisors 246 and 248, and with the VIOS 240 and 242 acting as agents.

The configuration for a migration environment includes at least one physical HBA configured in each of the source and target VIOS 240/242. These physical HBAs are configured to access the same logical unit numbers (LUNs), i.e., physical disk volumes, on the external storage subsystem 15 that is connected to the SAN 268. Each physical HBA is associated with one or more virtual Fibre Channel (VFC) adapters in each VIOS 240/242. LPAR 222 is configured with one or more VFC adapters from VIOS 240. During the mobility event, one or more additional VFC adapters are created on the target LPAR 288. During migration the LPAR's 222 memory pages are copied asynchronously from the source system server 12 to the target system server 12, and LPARs 222 and 288 maintain uninterrupted access to running applications.

The VFC adapters may implement N_Port ID Virtualization (NPIV) technology. A VFC adapter that implements NPIV technology may also be referred to as a NPIV adapter. NPIV allows a single HBA, referred to an N_Port in NPIV, to register multiple World Wide Port Names (WWPNs) and N_Port identification numbers. A WWPN uniquely identifies an endpoint on a SAN. Each VFC adapter is assigned a pair of WWPNs for accessing the LPAR's LUNs on the external storage subsystem 15. During the mobility event, migrating LPAR 222 uses one WWPN for a connection through VIOS 240 and one for the connection through VIOS 242. During migration, LPAR 222 is briefly active on both the source and target server systems 12 while the LPAR's 222 memory pages are being transferred. Therefore, the pair of WWPNs maintains the unique endpoint identity, as required by connections to a SAN 268.

The VIOS 240 may continue the mobility event without validation if the LPAR's validation inventory is marked as passed and has not changed since the LPAR's activation. Therefore, unnecessary validation checks may be avoided, reducing migration time. The source and target VIOS s 240 and 242 communicate with each other over the public network 252 and/or the private network 254 through the service processors 260/262. The control point 250 creates the target LPAR 288 on the target server system 12, using both the contents of the validation inventory from LPAR 288 and configuration profile 205. The source hypervisor 246 sends and tracks the memory pages from source LPAR 222, thereby enabling the migrating LPAR 222 to continue to run during the mobility event.

Figure 3:
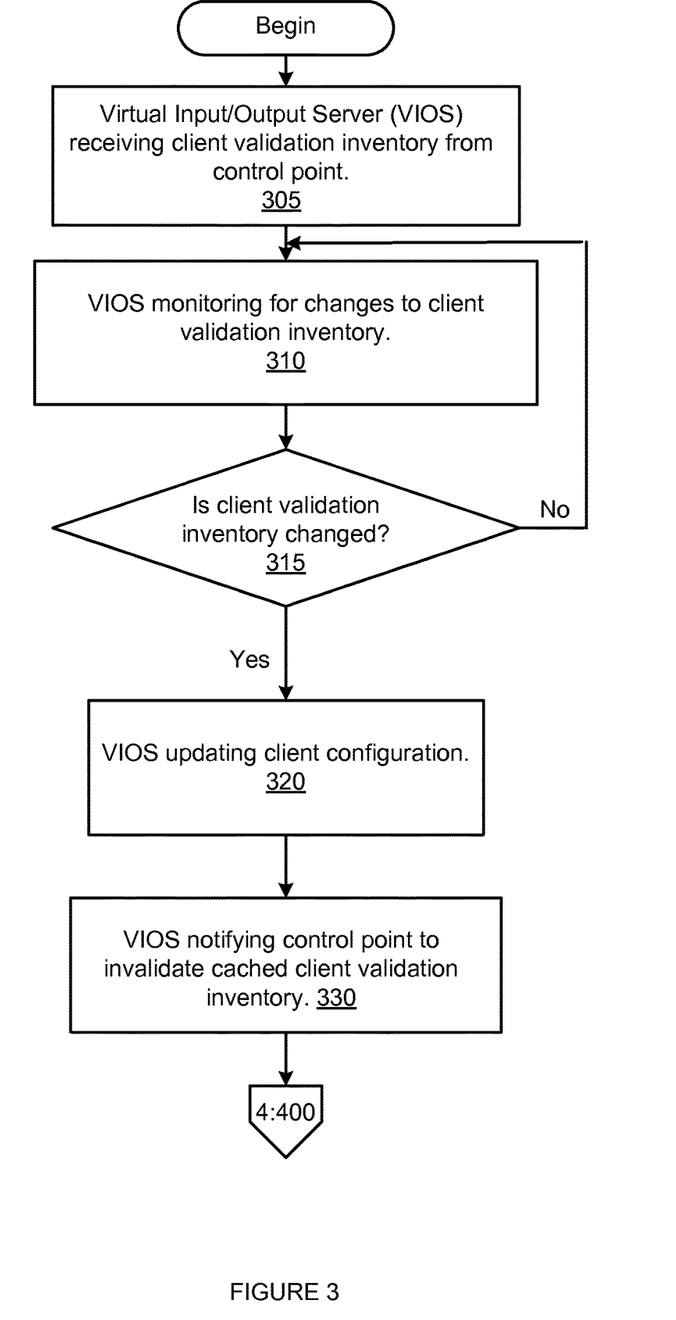
FIG. 3 shows an operational flow chart for validating operating system migrations from the view of a virtualization manager.
Figure 4:
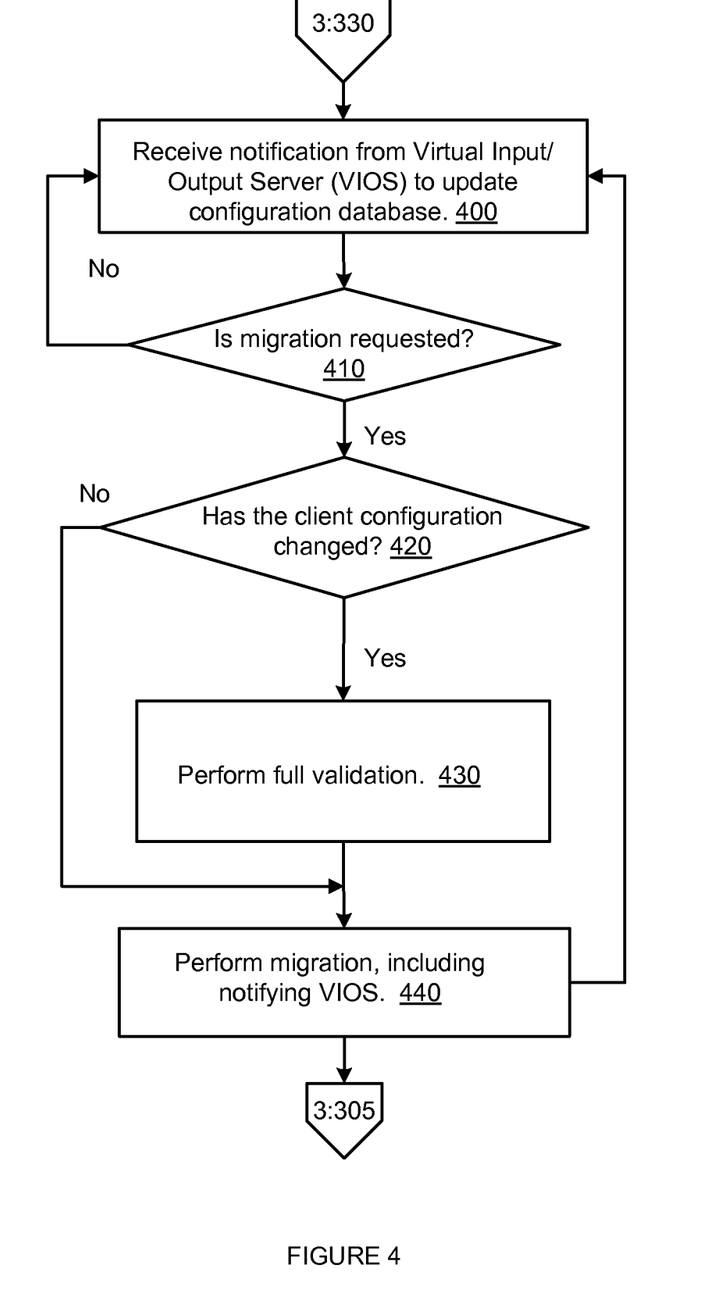
FIG. 4 shows an operational flow chart for validating operating system migrations, from the view of a control point.

FIG. 3 illustrates validating an operating system migration from the view of a VIOS. At 305 as part of LPAR activation, the VIOS 240 (FIG. 2) receives the LPAR's validation inventory from the control point 250 (FIG. 2). Following LPAR 222 (FIG. 2) activation, at 310 the VIOS 240 monitors the LPAR 222 for events that may invalidate the validation inventory, in particular configuration changes in VFC adapter, SAN 268, or external storage subsystem 15 (both of FIG. 2). Exemplary events include addition of a new VFC adapter to the LPAR 222, a change or deletion of a VFC adapter in the LPAR 222, a request for I/O via a specific VFC adapter where the validation inventory does not include the target LUNs, and an attempt to access a Fibre Channel fabric (i.e., SAN 268) where the VFC adapter is unknown to the SAN 268. These change events may be performed by an administrator modifying the LPAR's configuration profile 205 (FIG. 2) at the VIOS 240 console, or by an administrator making the modifications at the OS console of the active LPAR 222. If at 315 the VIOS 240 does not detect a change in the LPAR's 222 validation inventory, steady-state monitoring continues at 310. However if at 315 the VIOS 240 detects a change, at 320 the VIOS 240 updates the LPAR's 222 configuration. At 330 the VIOS 240 notifies the control point 250 (FIG. 2) to invalidate the LPAR's 222 cached validation inventory. The notification includes details of the changed resource. For example, when a VFC adapter is the changed resource, inventory details may include the adapter's WWPN pair, the VFC adapter's associated SAN 268 fabric, and LUNs identifiers associated with the WWPNs. In the algorithm of FIG. 4 the control point 250 acts on the notification from the VIOS 240, and the VIOS 240 resumes monitoring for notification of a changed LPAR 222 inventory.

FIG. 4 illustrates validating an operating system migration from the view of a control point 250 (FIG. 2). At 400 the control point 250 receives notification from the VIOS 240 (FIG. 2) that an LPAR's validation inventory is invalidated. If at 410 an LPAR migration has been requested, the control point 250 updates the configuration database corresponding to the LPAR based on the received notification, and continues to monitor for notifications from the VIOS 240 (block 400). If at 410 the notification is part of an LPAR migration request, and at 420 the LPAR's 222 (FIG. 2) configuration is changed, the control point 250 performs a full validation of the LPAR's 222 configuration (block 430). However, if at 420 the configuration changes do not require full validation, the control point 250 performs the LPAR 222 migration and notifies the VIOS 240 of the results (block 440) prior to continuing to monitor for notifications at 400. Following the full validation, at 440 the control point 250 performs the migration of LPAR 222 to LPAR 288 and notifies VIOS 242 of the validated inventory during activation of the migrating LPAR (block 440). The control point 250 continues to monitor for notifications at 400.

Although presented in context of VFC NPIV adapters and WWPNs, the algorithms of FIGS. 3 and 4 may also apply to tracking LUN accesses through other storage technologies, for example SAS, SATA, iSCSI, and virtual SCSI, and tracking IP-based networking, such as VLAN availability between LPARs.

In another embodiment monitoring agents, such as may be installed on a SAN administrative server, may detect changes in LPAR configuration relative to the SAN and notify the control point 250 to re-validate a validation inventory. In a further embodiment, configuration-aware software, such as configuration management or high-availability automation software, may notify the control point 250 when a fail-over or configuration change event occurs. In another embodiment, the operating system within an LPAR can hint directly to the control point 250 that a new validation is required, such as a resource group or topology change or migration as a result of a high availability event.

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method to reduce redundant validations for live operating system migration to increase performance of a previous mobility event, the method comprising:
monitoring, by a virtualization manager, for configuration changes in a validation inventory, wherein the validation inventory comprises data selected from a group consisting of: physical hardware data related to a previous mobility event, and virtual hardware data related to the previous mobility event, and wherein the live operating system migration is performed by a control point and the virtualization manager in combination, and wherein monitoring for the configuration changes in the validation inventory based on determining configuration changes in one or more of a Virtual Fiber Channel (VFC), a Storage Area Network (SAN), and an external storage subsystem;
receiving a request to perform the live operating system migration of a logical partition (LPAR) from a source LPAR on a source computer to a target LPAR on a target computer, wherein the target LPAR is created using the validation inventory corresponding to the source LPAR, receiving from a repository of validation inventory and based on the received request the validation inventory corresponding to the source LPAR;

in response to determining that the monitored validation inventory has changed, re-validating the received validation inventory prior to beginning the live operating system migration of the source LPAR to the target LPAR and re-caching the repository of validation inventory with the re-validated validation inventory, perform the live operating system migration of the source LPAR to the target LPAR;

and in response to determining that the monitored validation inventory has not changed, perform the live operating system migration of the source LPAR to the target LPAR by using contents of the unchanged validation inventory, allowing the source LPAR to continually run during the live operating system migration, and without performing the re-validation of the received validation inventory.

2. The method of claim 1, further comprising:

receiving, at the control point, from the virtualization manager a validation list, wherein the validation list includes one or more physical or virtual hardware resources that have changed in the validation inventory since the previous mobility event;

re-validating the validation inventory prior to beginning the migrating;

updating the repository of validation inventory with the re-validated validation inventory; and sending to the virtualization manager the re-validated validation inventory.

3. The method of claim 1, wherein the source LPAR hints directly to the control point to re-validate the validation inventory corresponding to the source LPAR in response to a high availability fail-over event.

4. The method of claim 1, further comprising:

receiving, by the virtualization manager, one or more changes in the validation inventory corresponding to the source LPAR, wherein the control point sends the one or more changes;

applying the received changes to the validation inventory corresponding to the source LPAR; and notifying the control point to invalidate a cached copy of the validation inventory corresponding to the source LPAR.

5. The method of claim 1, wherein the validation inventory includes:

an indication of validity of the validation inventory;

a unique LPAR identifier;

physical and virtual I/O device configuration;

the source and target physical computer systems;

an indication of priority for receiving excess system resources;

an operating system environment;

an amount of memory;

processor capacity;

a World Wide port number (WWPN) pair associated with a virtual fiber channel (VFC) adapter;

an identifier associated with a fabric to which the VFC adapter is attached; and logical unit (LUN) identifiers associated with the WWPN pair to which the VFC adapter is attached.

6. The method of claim 2, wherein re-validating the validation inventory further comprises:

partially validating, by the control point, the validation inventory, wherein only a changed resource is validated; and fully validating, by the control point, each resource in the validation inventory.

* * * * *